United States Patent [19]

Shepherd et al.

[11] Patent Number: 4,669,020

[45] Date of Patent: May 26, 1987

[54] CASSETTE PRESSURE PAD IMPROVEMENT

[76] Inventors: Harold L. Shepherd; George Spector, both of 233 Broadway RM 3615, New York, N.Y. 10007

[21] Appl. No.: 611,711

[22] Filed: May 18, 1984

[51] Int. Cl.[4] .......................... G11B 5/11; G11B 23/04
[52] U.S. Cl. .......................... 360/130.32; 360/130.33
[58] Field of Search ..................... 360/130.33, 130.32, 360/128

[56] References Cited

U.S. PATENT DOCUMENTS

| | | | |
|---|---|---|---|
| 4,093,967 | 6/1978 | Satou et al. | 360/130.33 |
| 4,257,077 | 3/1981 | Ishida | 360/130.33 |
| 4,320,429 | 3/1982 | Knerich et al. | 360/130.32 |
| 4,337,493 | 6/1982 | Kagano | 360/130.33 |

OTHER PUBLICATIONS

Fisher et al., "Sponge Pad . . . Cartridge", Tech. Notes Tn No. 1124, Mailed 8/11/75.

*Primary Examiner*—Robert S. Tupper

[57] ABSTRACT

An improved pressure pad construction for a cassette is provided, comprising a soft foam material properly dimensioned to fit snugly between the magnetic shield plate and the tape and between the cassette sides, which in one form includes a bracket which is spring mounted adjustably along the magnetic shield plate and a method for replacing the usual pressure pad with an improved pad.

1 Claim, 7 Drawing Figures

CASSETTE PRESSURE PAD IMPROVEMENT

BACKGROUND OF THE INVENTION

This instant invention relates generally to magnetic tape cassettes and more specifically it relates to an improved new practical buffering element and a method of installing it into a magnetic tape cassette.

Numerous magnetic tape cassettes have been provided in prior art that are adapted to have a pad device for giving pressure contact of the magnetic tape to a magnetic head of a tape recorder. For example U.S. Pat. Nos. 3,851,115; 4,337,493, and 4,380,035 are are illustrative of such prior art. While these units may be suitable for the particular purpose to which they address they would to be suitable for the purposes of the present invention as heretofore described.

SUMMARY OF THE INVENTION

A principle object of the present invention is to provide an improved new and practical buffering element that can be installed into a magnetic tape cassette to replace its existing pressure pad.

Another object is to provide a new improved practical buffering element that consists of a soft foam material wide enough to fit between a magnetic shield plate and a magnetic tape and thick enough to fit snugly between sides of the magnetic tape cassette's plastic shell.

An additional object is to provide a new improved practical buffering element that is slideably mounted and adjustably biased along the magnetic shield plate.

A further object is to provide an improved new practical buffering element that is simple and easy to use.

A still further object is to provide a new improved practical buffering element that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings ate illustrative only, and that changes may be made in the specific construction illustrated and described within the scope of the appended claims.

BRIEF DESCRIPTION OF THE DRAWING FIGURES

DETAILED DESCRIPTION OF THE PREFERRED EMBODIMENTS

Figure 1:
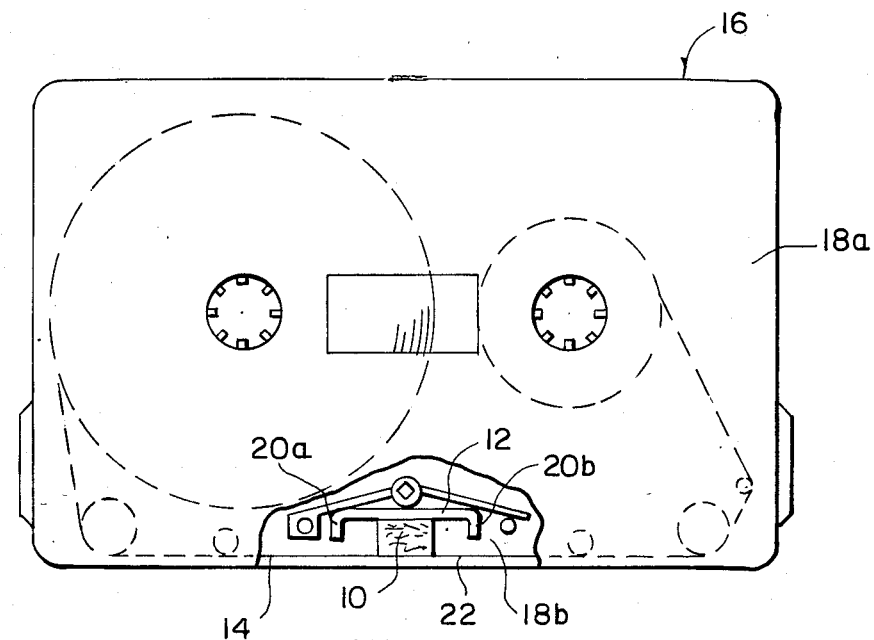
FIG.1 is a partially cut out top plan view of a magnetic tape cassette showing the invention installed therin.
Figure 2:
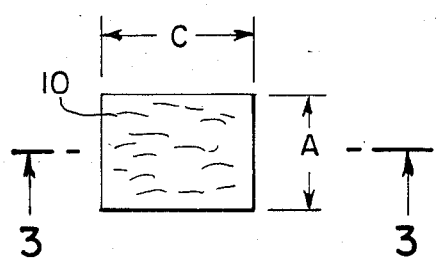
FIG. 2 is a top view of the invention.
Figure 3:
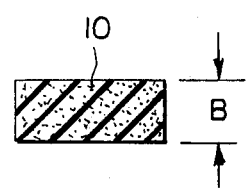
FIG. 3 is a cross sectional view taken along line 3—3 in FIG. 2.
Figure 4:
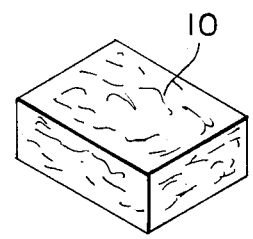
FIG. 4 is a perspective view thereof.

Turning now descriptively to the drawings, in which similar reference characters denote similar elements throughout the several view, FIGS. 2 through 4 illustrates an improved new practical buffering element 10 that is a block formed from a soft foam material such as plastic or rubber. The new soft beffering element 10 has a width as indicated by the letter "A" of about ⅜ of an inch and is wide enough to fit between a magnetic shield plate 12 and a magnetic tape 14 of a magnetic tape cassette 16 (see FIG. 1). The buffering element 10 has a height as indicated by the letter "B" of about 3/6 of an inch and is thick enough to fit between sides 18a, 18b of the magnetic tape cassette 16 (see FIG. 7). The new practical buffering element 10 has a length as indicated by the letter "C" of about ½ inch and is long enough to fit comfortably between the legs 20a, 20b of the magnetic shield plate 12.

Figure 7:
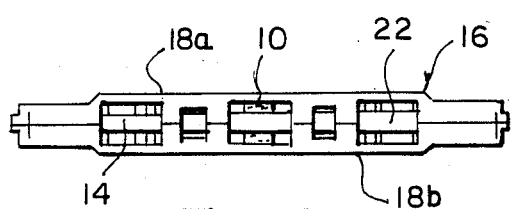
FIG. 7 is a bottom view of the magnetic tape cassette showing the invention installed therein.

When installing the new practical improved buffering element 10 into the magnetic tape cassette 16 as shown in FIGS. 1 and 7, the following steps are taken.

1. Reel the magnetic tape 14 down to a leader tape 22 in the magnetic tape cassette 16.
2. Reel the leader tape 22 out to form a small U-shaped loop.
3. Remove existing pressure pad (not shown) from the magnetic shield plate 12.
4. Place the improved buffering element 10 down into center of the magnetic shield plate 12. Its shape will hold it in proper position.
5. Reel the leader tape 22 back down manually.

Figure 5:
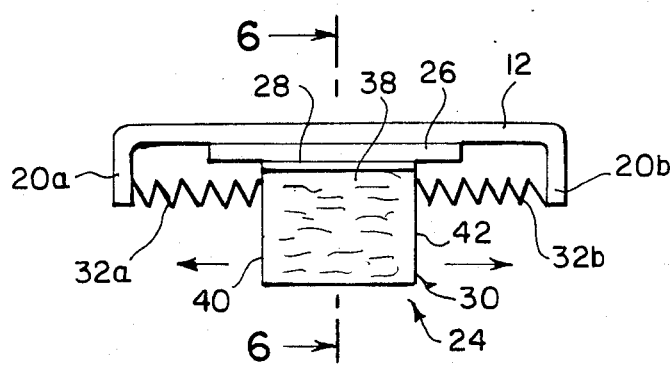
FIG. 5 is a top view of a modification showing the new improved practical buffering element slideably and adjustably mounted along the magnetic shield plate 15.
Figure 6:
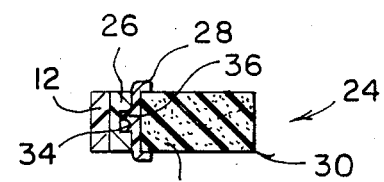
FIG. 6 is a cross sectional view taken along line 6—6 in FIG. 5.

FIGS. 5 and 6 shows a modified improved buffering element 24 which consists of a guide track 26, a bracket 28, a block of soft foam material 30 and a pair of non-magnetic springs 32a, 32b.

The guide track 6 is non-magnetic and has a slot 34 therein. The guide track is affixed to center of the magnetic shiled plate 12. The bracket 28 is non-magnetic and has a rib 36 that slides within the slot 34 of the guide track 26.

The block of soft foam material 30 is attached at its rear portion 38 to the bracket 28. The block 30 being wide enough to contact rear surface of the magnetic tape 14.

The spring 32a is mounted between side 40 of the block 30 and the leg 20b of the magnetic shield plate 12.

The springs 32a, 32b adjustably bias block 10 centrally along the magnetic shield plate 12 to reduce friction against the magnetic tape 14.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. An improved buffering pad in combination with a magnetic shield in a tape cassette wherein said pad is formed from a soft elastic material and includes means for centering said pad relative to said shield and for slideably engaging said shield on one side and the tape on an opposite side of said pad wherein said means comprises:
   (a) a guide track having a slot therein, said guide track mounted on said magnetic shield;
   (b) a bracket having a rib that slides within the slot of said guide track;
   (c) a block of soft foam material forming said pad being attached at its rear portion to said bracket, said block being wide enough to contact rear surface of a magnetic tape; and
   (d) a pair of non-magnetic springs, each said spring mounted between a side of said block and a leg of the magnetic shield to adjustably bias the block along said shield.

* * * * *